United States Patent [19]

du Manoir de Juaye et al.

[11] 4,334,990
[45] Jun. 15, 1982

[54] CARTRIDGE FOR ACTIVE FILTRATION AND TREATMENT OF LIQUID METALS AND ALLOYS

[75] Inventors: Pierre du Manoir de Juaye, Cognin; Pierre Guérit, Chambery; Gilbert Pollet, La Ravoire; Jean-Marie Hicter, Voiron, all of France

[73] Assignee: Servimetal, Paris, France

[21] Appl. No.: 178,432

[22] Filed: Aug. 15, 1980

[30] Foreign Application Priority Data

Aug. 24, 1979 [FR] France ............................... 79 21957

[51] Int. Cl.³ ..................... B01D 27/02; B01D 27/04
[52] U.S. Cl. ................................. 210/186; 210/274; 210/282; 210/283; 210/510
[58] Field of Search .............. 210/773, 806, 807, 266, 210/274, 282, 289, 291, 317, 318, 503, 510, 186, 283

[56] References Cited

U.S. PATENT DOCUMENTS

| | | | |
|---|---|---|---|
| 3,024,913 | 3/1962 | Edmunds | 210/510 |
| 3,347,387 | 10/1967 | Balogh | 210/282 |
| 3,907,962 | 9/1975 | Ogiso | 210/773 |
| 3,950,251 | 4/1976 | Hiller | 210/282 |
| 4,052,198 | 10/1977 | Yarwood et al. | 210/773 |
| 4,113,241 | 9/1978 | Dore | 210/510 |

*Primary Examiner*—Ivars C. Cintins
*Attorney, Agent, or Firm*—McDougall, Hersh & Scott

[57] ABSTRACT

The invention concerns an apparatus for active filtration and treatment of liquid metals and alloys and particularly to the purification of aluminum, magnesium, or alloys based on aluminum or magnesium, prior to molding. It comprises a detachable cartridge, closed at at least one end by a porous block based on grains of fritted flux and filled with grains of flux, solid at the temperature of the metal to be filtered. The cartridge may include a means for injecting an active or inert gas into the grains; it may be arranged in a heated, heat insulated ladle.

21 Claims, 9 Drawing Figures

CARTRIDGE FOR ACTIVE FILTRATION AND TREATMENT OF LIQUID METALS AND ALLOYS

The invention relates to a method and apparatus for treating a liquid metal or alloy by passing it through a detachable cartridge, which is closed at at least one end by a porous slab, preferably based on fritted flux, at least part of the cartridge being filled with grains of solid flux, wherein the apparatus may further comprise a means for injecting gas (or vapor). It applies particularly to the smelting of light metals and alloys, especially aluminium and its alloys, magnesium and its alloys, and some other metals with low melting points which are compatible with the use of normal fluxes based on metallic halides, such as lead, tin or zinc.

It is generally accepted that the word "treatment" should be applied to all the operations undergone by a rough-fused liquid metal or alloy before it is used in smelting, with a view to eliminating impurities and particularly inclusions which would adversely affect the properties of the products cast. These operations may be purely physical, such as filtration, or physico-chemical such as putting into contact with fluxes.

In the casting of individual items as well as in semi-continuous casting of slabs, billets or ingots and continuous casting, there is an awareness of the need to filter the metal if sound, flawless castings are to be obtained. In practice, mechanical filtration has been combined with "washing" with a flux, generally consisting of one or more molten alkali metal or alkaline earth metal halides, to facilitate "wetting" of the inclusions and bringing them together in the form of dross.

When inclusions which are not wetted by the metal but wetted by the fluxes reach a metal/liquid flux interface thus created, they are trapped at the interface and pass into the liquid flux. The inclusions are removed from the liquid metal during this "washing".

For a given quantity of liquid metal to be treated and a given quantity of flux, the treatment carried out is more effective, the more the liquid metal/liquid flux interfacial surface is developed (fine dispersion or emulsion) and the more the liquids are stirred, because of the renewal of the liquids in the vicinity of the interface.

The use of grains of solid flux for purifying aluminum and aluminum-based alloy has already been described in an article by SPASSKI and KLIAGINA, Liteinoe Proizvostno No. 4, 1959, pages 30 to 32, and forms the subject matter of British patent GB 1,148,344 in the name of FOSECO INTERNATIONAL Ltd., Japanese Patent No. JA 49-27 921/74 in the name of KOKISO, German Pat. No. DE 1,941,270 in the name of OGISO and in the copending U.S. application Ser. No. 111,905, filed Jan. 14, 1980 and entitled "Filtration Block for Liquid Metals and Alloys with a Mechanical and Physical-Chemical Effect".

In the above, the aluminum to be purified passes through a bed of grains, obtained by fusing one or more alkali metal and alkaline earth metal halides, followed by crushing.

However, the process has a certain number of disadvantages: it creates difficulties in starting, in changing the metal or alloy being treated, for continuous operation on large quantities of metal, ranging from several tons to several tens of tons and for procedures with simultaneous degassing of the metal treated. Nor does it give any protection from the phenomenon of pyrohydrolysis, whereby the alkaline and alkaline earth halides, which are put into contact with air in varying states of humidity at high temperature, are decomposed into oxychlorides or oxides and give off hydrochloric acid.

The use of porous blocks based on porous ceramics (French Pat. Nos. 2 375 328, 2 375 329, 2 381 001) or porous silicon carbide (French Pat. No. 2 140 593) again does not completely solve the filtration problem: in addition to the danger of having small particles of ceramics breaking away from the filter blocks and being carried along in the stream of metal, the output of the filters is generally very inadequate to feed the casting installations located downstream.

At the present time the requirements of the aeronautical industry, for thin strips for casing, thin sheets and fine wires are forcing the producers of semi-manufactured light metal and alloy products to improve their quality continually. This is the more so since the refinement of analytical methods has revealed that microscopic inclusions, which were hitherto considered negligible, can adversely affect certain mechanical properties and increase the quantity of rejects.

The invention makes it possible to obtain a far cleaner metal than known methods.

It concerns an arrangement for physico-chemical purification of a liquid metal, comprising a detachable cartridge which is closed at at least one end by a porous block based on fritted flux, at least part of the cartridge being filled with grains of solid flux; the arrangement may further comprise a means for injecting gas or vapor into the grains of solid flux. With this apparatus pyrohydrolysis of the constituents of the flux can be avoided.

The following definitions will hereinafter be used:

"metal to be filtered": the metal or alloy which has to undergo the filtering treatment on the cartridge according to the invention, "active mineral compound": a mineral salt, or a mixture or combination of mineral salts, fulfilling the function of a flux by exerting a chemical and/or physico-chemical action on the inclusions and various impurities present in the metals to be treated, this action eventually eliminating the inclusions and impurities from the metal treated, "treatment" of the metal or alloy: the process of physico-chemical purification according to the invention.

Since the invention is characterized by the combination of porous blocks based on fritted flux and grains of solid flux in a detachable cartridge, we shall describe these various components in turn.

In the drawings

A—The Porous Blocks

Figure 1:
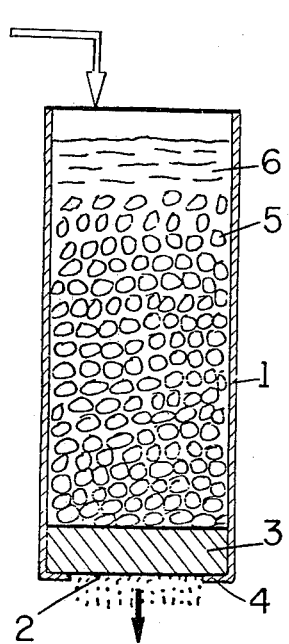
FIGS. 1 to 6 show various models of detachable cartridges, comprising at least one filter block and grains of solid flux.

The porous block or blocks closing at least one end of the cartridge may be a passive porous block, its principle function being to contain the grains of solid flux in the cartridge and, where appropriate, to retain any small particles of solid flux which may break away and be carried along in the stream of liquid metal. In this case the porous block may be of any known type, with sufficient open porosity (not less than 40%) to give a flow of liquid metal compatible with the requirements of the industrial application, and chemically resistant to the metal to be treated.

Graphite, silicon carbide, porous ceramics or even certain sintered metals are suitable for this purpose.

It has been found, however, that the treatment of the metal to be filtered can be made substantially more effective overall if the porous blocks are made by agglomerating and preferably by sintering elements of flux. In the description of the sintered porous blocks we shall use the following definitions:

"agglomeration": any method of forming a porous structure which is mechanically stable at the filtering temperature from elements of active mineral compound, "elements": the elements which are agglomerated to form the filtering block, whatever their shape: they may be grains of regular geometrical shape, crystals, grains with irregular cracking, grains of elongated shape and even acicular grains, rods or fibers of circular or any other section.

Blocks of sintered flux formed the subject matter of the aforementioned copending application Ser. No. 111,905.

The general idea of the invention disclosed in the afore-mentioned application is to combine in a single structure purely mechanical filtration, for retaining inclusions and other foreign elements larger than the channels of the filter, and physico-chemical purification by an active mineral compound acting as a flux, which enables the inclusions to be trapped at the flux/liquid metal interface. It has been found that this effect of physico-chemical purification by flux is an effective, under certain conditions, with a solid flux in grain form as it is with a liquid flux that has hitherto been used; these conditions are, in particular, the provision of a large area of contact between the grains of solid flux and the liquid metal to be treated. It has also been found possible to agglomerate elements of solid flux, e.g. by sintering, thus forming porous masses with both the shape and the dimensions of channels and open porosities; this allows for mechanical filtration, particularly by trapping inclusions, owing to the contorted shape of the channels formed between the elements and owing to the large area of contact with the liquid metal, enabling physico-chemical purification to be carried out. The fluxes which lend themselves best to agglomeration and which also have a melting point higher than the temperature of the metals and alloys to be purified have been found to be essentially simple or complex mineral fluorides, particularly alkali metal or alkaline earth metal fluorides of magnesium, aluminum and manganese. The use of sodium salts, although theoretically possible, is sometimes impossible in cases where aluminum and most aluminum-based alloys are being treated, since it brings a danger of introducing sodium into the metal being filtered; this element is known to have an unfavourable effect, particularly on hypersilicated Al-Mg and Al-Si alloys, even at very low concentrations.

Of all the possible combinations of the above fluorides we should mention the binary, ternary or even quaternary combinations where the melting point is preferably above 800° C.

This is the case e.g. with the following compositions, which are given in percentages by weight, as non-restrictive examples:

| | |
|---|---|
| $CaF_2$ (45.0%) - $MgF_2$ (55.0) - M.P. | 980° C. |
| $AlF_3$ (8.5%) - KF (91.5%) - M.P. | 820° C. |
| $AlF_3$ (41.0%) - $CaF_2$ (59.0%) - M.P. | 840° C. |
| $BaF_2$ (85.0%) - $MgF_2$ (15.0%) - M.P. | 910° C. |
| $BaF_2$ (30.0%) - $CaF_2$ (70.0%) - M.P. | 1050° C. |
| $CaF_2$ (49.0%) - $MgF_2$ (49.0%) - M.P. $LiF_2$ (2.0%) | 950° C. |

The nature and shape of the elements forming the filter block may also vary within fairly wide limits.

The elements may be homogeneous, that is to say made up of the active mineral compound throughout, or heterogeneous, that is to say made up of an inert substrate covered with active mineral compound, or a porous inert substrate impregnated with active mineral compound. The filter block, as an entity, may consist of elements of the same type (homogeneous or hetrogeneous) or a mixture of elements of different types.

The inert substrate may be selected from mineral compounds which do not react with the metals to be treated. This is the case particularly with electro-molten alumina (corundum), electro-molten alumina-zirconia compounds (zirconia corundums), with various silicoaluminous ceramic products and with silicon carbide.

Carbon-containing substances such as graphite or certain cokes may equally be used. Other compounds such as nitrides or oxynitrides of boron or silicon may be suitable, although their high price makes them uninteresting.

The shape and size of the elements is also an important factor: the shape of the elements determines the active surface area of the filter block and the shape of the channels. This area, which is minimal with spherical grains, is increased by the use of tubular or acicular grains or of grains obtained by crushing spheres or other simple geometrical shapes. The use of elements in the form of rods or elongated fibers, where the ratio of length to the average transverse dimension may be from 5 to 200, for example, gives filter blocks with a felty structure. These are very effective by reason of the large active surface area, the particularly contorted shape of the channels and the high degree of porosity inherent in this type of entangled arrangement.

Porous elements with a heterogeneous structure may be obtained, in known manner, by agglomerating a stable compound—alumina for example—with a compound which can be sublimated or decomposed hot and which is removed at the hot agglomeration or fritting stage, then by impregnation with the molten active mineral compound.

Porous elements with a homogeneous structure can similarly be obtained by mixing the active mineral compound with a substance which can be removed hot by volatilization or pyrolysis at the agglomeration stage.

The size of the elements and distribution of grain sizes is one of the factors determining the porosity and permeability of the filter, which in practice are equivalent to its hourly filtering capacity.

A filter block according to the invention, for example, made up of elements comprising grains of 4 to 8 mm at a thickness of 40 mm, has been found to have a capacity for filtering liquid aluminum at about 750° C. of approximately 12 kg per square centimeter of area per hour, with a pressure drop of 10 to 20 mm of liquid aluminum. The porosity of such a filter is approximately 40%.

It is possible to use elements with much smaller dimensions, down to a few tens of micrometers, provided that the agglomerating process results in sufficient permeability to give the high filtering outputs required by industrial processes.

Agglomeration of elements in the form of rods 1 mm in diameter and 15 mm long results in a felty structure, which has a porosity of up to 80 to 90% and a capacity for filtering liquid aluminum at 750° C. of approximately 25 kg per square centimeter of area per hour, at a thickness of 50 mm.

Since the filter blocks are made by agglomerating elements, they may be given any shapes and dimensions required by the various uses to which they are to be put: slabs of simple or relatively complex geometrical shapes, cylinders, tubes, crucibles, stoppers or nozzles, which may be arranged above a ladle, in a runner at the inlet to a mold. In this last case the metal may be given its final treatment at the very last moment before it enters the mold, at a place where any causes of pollution and external contamination have disappeared, thus ensuring that the castings or moldings are of a quality which could not hitherto be achieved.

The method of making the filter blocks may be applied in various ways, according to the nature of the component grains.

In a first embodiment the active mineral compound is melted, cast in a thin slab a few millimeters thick and ground. The elements are graded to the desired grain size by screening.

The elements are then placed in a mold and heated in a dry atmosphere, at a temperature slightly below the melting temperature of the active mineral compound, so as to bring about sintering. Fritting is carried out without pressure. It is also possible to exert moderate pressure during sintering with a relative reduction in temperature and/or the duration of the operation. Generally speaking, agglomeration by fritting is carried out in a dry atmosphere, avoiding any contact with a flame, at a temperature about 5° to 150° C. below the melting point of the mineral compound, for a period ranging from 5 minutes to 1 to 2 hours.

The porous structure thus obtained is mechanically very stable and resistant.

In a different embodiment of the manufacturing method the mixture of mineral compounds is compressed into tablets or pellets, then the tablets or pellets are crushed to obtain the elements. These are graded by screening and agglomerated by sintering as just described.

Elements in the form of rods or elongated fibres can be obtained by various known processes. For example, the molten active mineral compound may be cast by gravity through a graphite die containing a plurality of orifices calibrated to the desired diameter, then cooled rapidly; or alternatively a paste consisting of the active mineral compound in powder or fine crystal form and a binder which can be eliminated hot by evaporation or pyrolysis at the agglomeration stage may be drawn through a d e. In the latter case fibers or rods with a porous structure are obtained.

In cases where heterogeneous elements are used, other embodiments can be envisaged, depending on whether or not the elements are porous. The general method comprises coating or impregnating the elements with active mineral compound, e.g. by immersion in the compound in the molten state, then, after cooling, proceeding to further crushing followed by grading through screening, putting into a mould and sintering.

In cases where the starting material is an active mineral compound in grains of very small dimensions, ranging from a few tens of micrometers to one or two millimeters, a structure with sufficient porosity can be obtained by making a preliminary mix by known methods, with a binder which will be eliminated at the agglomeration stage, e.g. an organic compound which can be sublimated such as camphor, naphthalene or hexachloroethane, or one which can be pyrolysed, such as polyethylene or polyurethane.

Finally, another embodiment comprises first preparing a structure of inert material which is porous or spongy with open porosities, by any known process, and impregnating it with an active mineral compound. For example, grains of alumina may be agglomerated by sintering, to give a porous structure, after which the structure may be impregnated by immersion in a bath of more active mineral compound and any excess mineral compound may be eliminated by vibration, suction, centrifuging, etc. It is also possible, in known manner, to start with a spongy element made of an organic substance which can be eliminated or destroyed hot, e.g. expanded polyurethane foam, to impregnate it by immersion in a bath (barbotine) composed of the active mineral compound and a solvent or an aqueous or non-aqueous dispersing agent, and to proceed to burn the element, resulting both in destruction of the polyurethane foam and agglomeration of the active mineral compound. This last process, applied to the formation of porous ceramic structures, has been described particularly in U.S. Pat. Nos. 3,090,094 and 3,097,930.

B-The Grains of Solid Flux

These comprise at least one simple or complex halide of a metal belonging to the group including sodium, potassium, lithium, calcium, barium, magnesium, aluminum and manganese.

The grains of solid flux used for partially or totally filling the cartridge may take very varied forms: for example spheres obtained by conventional methods such as ball-making, with diameters from about 2 to 15 mm, or granulated materials with various shapes and dimensions, obtained by any known agglomerating means.

Irregular, angular shapes may in particular be obtained by crushing spherical granules. The granules may be solid or porous. In the latter case an additive may, for example, be included with the granules when they are put into the mold, and will then be eliminated by evaporation or selective dissolution. Very varied shapes can be obtained by pelletizing, extruding a paste or compacting, e.g. in a ball press. It is also possible for part of the solid granulated material to consist of a substance which is inert vis-a-vis the metal to be treated and the constituents of the flux: for example alumina, silicon carbide, silicon oxynitride, carbon or various aluminous or silico-aluminous refractory materials, or other materials which are stable vis-a-vis the liquid metal. These inert granulated materials than have the sole function of dispersing the liquid metal, so as to increase the contact surfaces between the liquid metal and the solid flux.

Generally, a solid granule may comprise an inert core coated with active solid flux; the purpose of all the arrangements just described as non-restrictive examples being to provide the largest possible contact surface with the metal to be treated.

To summarise, it is possible to use four types of grain:

active, homogeneous grains used alone,
grains activated by impregnating with flux, used alone,
mixed grains, i.e. grains of a formulation which may include active elements and inert elements,
inert grains, which are always used mixed with active grains.

The following compositions have given complete satisfaction from the point of view both of activity and durability. They are given as non-restrictive examples, in percentages by weight.

TABLE I

|  | 1 | 2 | 3 | 4 | 5 | 6 | 7 | 8 | 9 |
|---|---|---|---|---|---|---|---|---|---|
| $AlF_3$ | 45 | 45 |  | 41 |  | 45 |  | 45 | 45 |
| $CaF_2$ | 55 |  | 50 | 59 | 49 | 53 | 45 |  | 53 |
| $MgF_2$ |  | 55 | 50 |  | 49 |  | 45 | 54 |  |
| LiF |  |  |  |  | 2 |  | 10 |  |  |
| LiCl |  |  |  |  |  | 2 |  |  |  |
| $MnCl_2$ |  |  |  |  |  |  |  | 1 |  |
| $MgCl_2$ |  |  |  |  |  |  |  |  | 2 |

C—The Detachable Cartridge

FIG. 1 shows the simplest embodiment. The cartridge 1 is sealed at the bottom 2 by the filter block 3 which bears on the edge 4. The filter block has been obtained by melting a binary mixture comprising 50% by weight of $MgF_2$ and 50% by weight of $CaF_2$ at approximately 1000° C. The liquid has been cast in the form of a slab 5 mm thick. The slab, when cooled, has been crushed and the crushed grains have been graded, by screening, to between 4 and 8 mm. Two percent by weight of LiF has been added to the graded grains and intimately mixed with them by prolonged stirring. The mixture has been placed in a mold in the form of a disc 200 mm in diameter and 40 mm thick, has been vibrated and compressed, then sintered by keeping it at 950° C. for 20 mins.

After cooling, a disc is obtained, with approximately 40% porosity and a filtering capacity of 3.6 tons per hour of liquid aluminum at approximately 750° C., with a pressure drop of about 15 mm of liquid aluminum. When the disc has been put into position, the cartridge is filled to three quarters of its height, or 50 cm, with grains of flux 5. These are of the following composition (by weight):

$CaF_2$: 49%
$MgF_2$: 49%
LiF: 2% and are obtained by melting the components, crushing the cooled block and grading to between 2 and 8 mm.

The liquid aluminum 6 is introduced at the top and runs out at the bottom. The cartridge will have been previously heated in such a way as to avoid any pyrohydrolysis.

Figure 2:
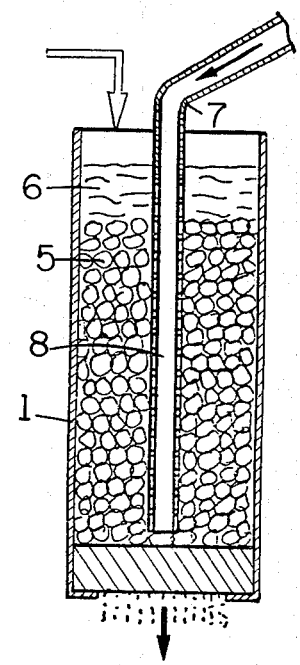

FIG. 2 shows the same arrangement as FIG. 1, together with a tube 7 for injecting gas into the bed of grains of solid flux. The tube may be made of a porous material, at the portion 8 located at the level of the grains, or may contain perforations over all or part of its height.

In this way it is possible to inject an insert gas (argon), an active gas (chlorine), mixtures of the both in varied proportions, or vapors of halogen derivitives such as hexachloroethane carried along by a stream of supporting gas such as nitrogen. This treatment is particularly well adapted to continuous casting at a low or medium rate.

Figure 3:
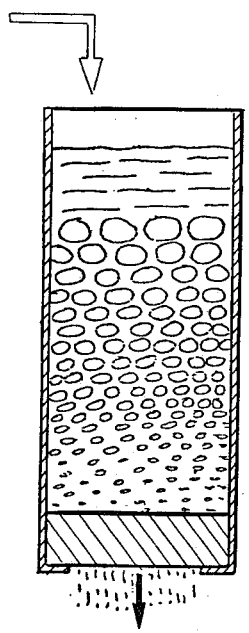

In FIG. 3 the bed of grains of flux has been built up with the grain size gradually increasing towards the top, so that any blockage of the filter bed would take place fairly evenly throughout the material and not only in the upper part, as might be the case in the FIG. 1 arrangement.

Figure 4:
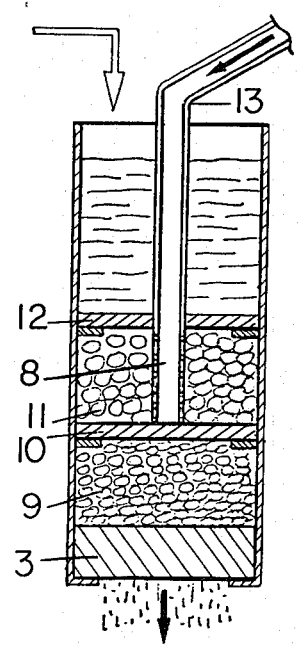

FIG. 4 concerns a slightly more complex arrangement, with a first layer of grains of solid flux 9 located between the filter block 3 and a fritted filtering partition 10, which is of the same structure as the block 3 but thinner, and a second layer 11 of grains of solid flux is located between the partition 10 and a partition 12 identical to the partition 10. A tube for injecting gas 13 is arranged in the second layer 11 of grains.

The two layers 9 and 11 of grains may be identical, although they may—preferably—differ in at least one of their physical or chemical properties, such as their grain size, chemical composition, melting point, capacity to retain a particular impurity, etc.

Figure 5:
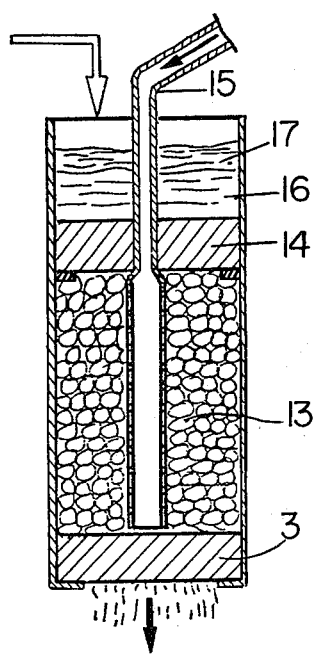

FIG. 5 shows a different arrangement, with the bed of grains 14 immobilized between the lower filtering block 3 and an upper filtering block 14. An arrangement of this type allows the metal to be filtered to be circulated in an upward or downward direction without any danger of entraining grains of solid flux. A gas-injecting tube 15 may also be provided.

The layer of metal to be filtered 16 may be covered with a layer of liquid flux 17 to protect it from the action of the air.

Figure 6:
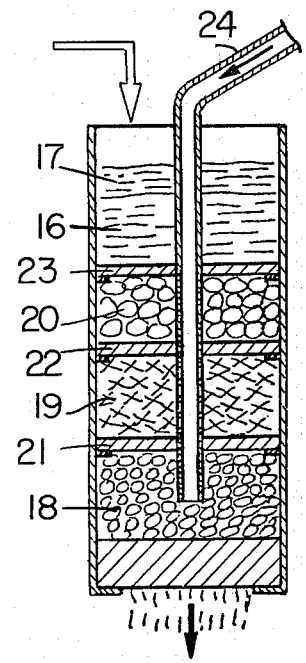

FIG. 6 shows an embodiment comparable with that in FIG. 4, with three layers 18, 19 and 20 of solid grains separated by partitions 21, 22 and 23. Each layer may have a different action: one may be designed to eliminate phosphorus (NaF granules), another sodium (coke granules), while a third may be a conventional flux which is solid at the filtering temperature. Gas may be injected into one or more of the layers 18, 19 and 20.

Figure 7:
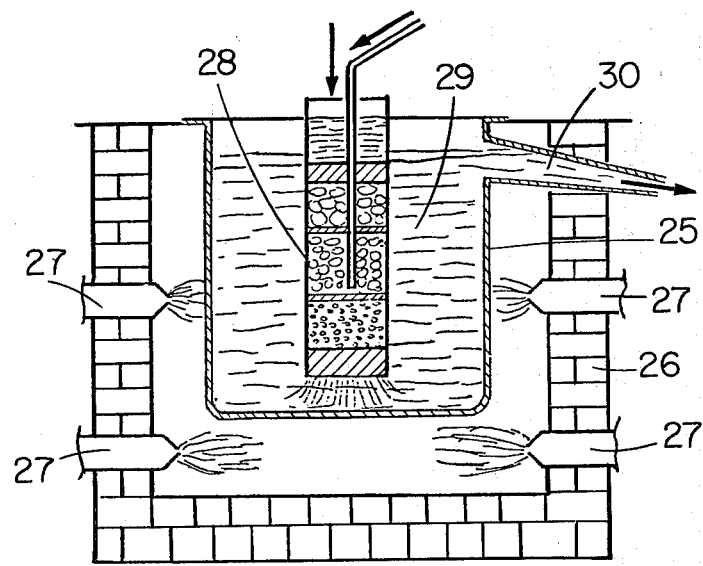
FIGS. 7, 8 and 9 show three filtration ladles with a detachable cartridge as the essential component.

FIG. 7 shows a entire filtering system comprising a ladle 25 placed in the temperature-maintaining furnace 26, which may be heated by any means such as the burners 27. The detachable filtering cartridge 28, which has a structure similar to that in FIG. 6, is supplied at the top with the metal to be purified. The purified metal 29 flows out at the bottom, accumulates in the ladle 25, and passes out through the spout 30 to the apparatus which will use it (casting frame).

Figure 8:
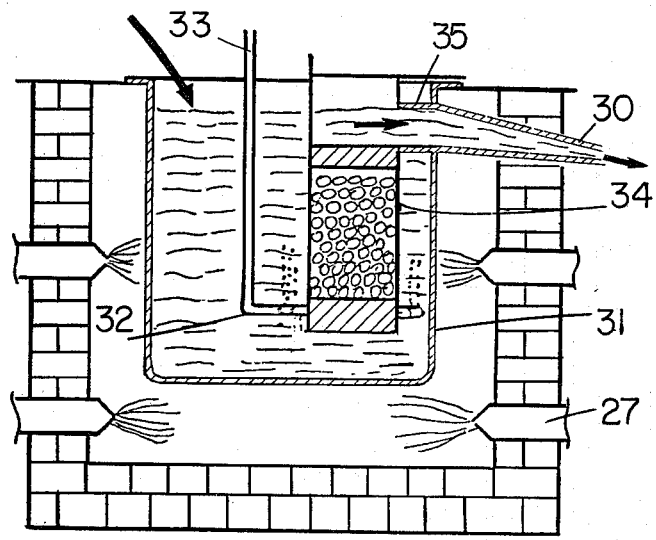

FIG. 8 shows a filtering ladle 30 similar to that in FIG. 7, except that gas is injected into the metal 32 by means of the injector 33, the lower part of which contains many perforations, before the metal passes through the filtering cartridge 34. It does this in an upward direction, then flows off from the top through the spout 35. Gas or vapors could of course be injected, in known manner, by means of a porous stopper arranged at the bottom of the ladle. In either case injection must be carried out so that the bubbles are released at the periphery of the cartridge and not below it, since they might lead to unclogging of the filter and inclusions might be carried along in the metal after treatment.

Figure 9:
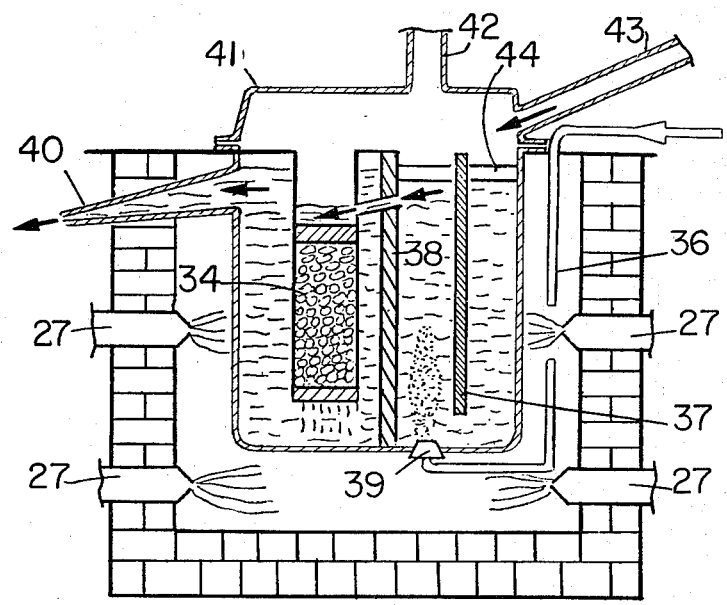

FIG. 9 shows a different embodiment, where the degassing by the treatment gas is carried out in an intermediate compartment, separated from the inlet compartment by a partition 37. The metal leaves this compartment by overflowing it and enters the top of the filtering cartridge 34 which is located in a third compartment, separated from the previous one by a partition 38. The metal treated is collected at the outlet of the spout 40. The inert gas may be injected e.g. by means of a porous stopper 39 connected to the gas pipe 36. The ladle may be provided with a cover 41, which will reduce both heat loss and the action of air. A duct 42 enables any fumes given off by the treatment ladle to be recovered so as to avoid any pollution of the environment. The metal to be treated may be fed in through the cover along a duct such as 43. A flux cover 44 may further be provided in the first and possibly the second compartment.

The arrangement shown in FIGS. 7, 8 and 9 also enables continuous treatment to be carried out, by placing two filtering cartridges in the ladle, one in action and the other in reserve. The flow of metal to be purified is diverted to the second cartridge after a predetermined length of time, corresponding to the onset of exhaustion of the first cartridge as established experimentally. These arrangements are given as non-restrictive examples. In particular, the ratio of the diameter of the cartridge to that of the ladle need not necessarily be as shown in the drawings: the cartridge could even occupy—or form— the whole of the compartment in which it is placed.

EXAMPLES OF APPLICATION OF THE INVENTION

Various test runs have been carried out with filtering cartridges with diameters ranging from 100 to 500 mm and lengths from 300 to 1000 mm.

A filtering cartridge of the type shown in FIG. 1, containing grains of solid flux corresponding to composition number 2 in table 1, with a grain size of 2 to 8 mm, and closed by a block of sintered flux 40 mm thick, has a filtering capacity of approximately 10 kg of liquid aluminum at 750° C. per hour per square centimeter of area. A cartridge 210 mm in diameter and 700 mm high will thus have a filtering capacity of approximately 3.5 tons of aluminum per hour. If the cartridge is fitted with a gas-injecting pipe, approximately 0.5 m3 of a nitrogen-chlorine-mixture containing 5% of chlorine may be injected during the treatment, or about 100 g per ton of aluminum of an inorganic or organic halogenated compound such as hexachloroethane vaporized and carried along by a stream of nitrogen.

The life of a given cartridge is limited by the onset of clogging, which substantially reduces both the discharge rate and the effectiveness of the treatment. The clogging appears more or less rapidly, depending on the metal treated.

To give an example, non-alloyed aluminum for electrical conductors of the type A5/L (content of $Al \geq 99.5\%$) or 1050 A in accordance with the Aluminium Association standard, was filtered in a ladle equipped with a cartridge 210 mm in diameter and 700 mm high.

With the metal at a temperature of 720° C. or slightly higher and the discharge rate adjusted to 2 tons per hour, the pressure drop was 15 mm at the beginning, 25 mm after 8 hours (16 tons of metal treated), and 75 mm after 15 hours (30 tons of metal treated).

Metal of type 1235 (Aluminium Association standard) designed for the manufacture of thin sheeting (0.05 to 0.1 mm) was filtered on the same type of cartridge. It was possible to treat 100 tons of the metal before the cartridge showed any signs of approaching exhaustion.

The effectiveness of the treatment was tested by the usual methods such as:

counting inclusions with an optical microscope, dosing oxygen by methods of neutron activation, making it possible to go as low as 0.2 ppm, measuring breaking stresses on samples taken in the direction of short cross cracks on rolled sheets, obtained with treated and untreated metal, measuring the number of breakages when machine wire obtained with treated and untreated metal is drawn to 0.5 mm: to average length between two breakages due to inclusions passed from 600 km to over 1800 km.

Application of the invention has many advantages over previous methods of treatment, using liquid fluxes or simple grains of solid flux.

The closing of the downstream end of the cartridge with a porous block enables the bed of solid grains to be held in position and prevents any particles of solid flux from being carried along in the stream of metal treated. When the upstream end of the cartridge also has a porous block it ensures that the stream of liquid metal to be treated is very well dispersed throughout the volume of the cartridge and avoids the formation of privileged paths formed at the expense of large dead zones (a phenomenon known as "foxing"). In addition, the cartridge can be fed with the metal to be purified either from the source or in a continuous flow.

Porous blocks which are compatible with injection of inert and/or active gas also make it possible to partition off layers of grains of flux with different compositions or structures—and thus different functions.

When these porous blocks are made of elements of fritted flux they also participate in the physico-chemical purification of the metal. Owing to the particularly contorted shape of the channels between the sintered elements, they are highly effective, and complement and greatly enhance the action of the grains of solid flux.

The grains of solid flux and the blocks of sintered flux can further be given highly specific and different properties (porosity, granulometry, chemical composition, special reactivity with an impurity or a given component of the metal or alloy being treated). In this way the combination of grains of solid flux with the blocks of sintered flux produces standards of purification which could not be achieved by known methods.

In the form of a compact, detachable cartridge, they may be used in ladles of simple structure and small dimensions, compatible with existing apparatus for continuous or discontinuous casting.

The invention can be applied to most processes for molding aluminum, magnesium and alloys based on aluminum or magnesium from the liquid metal; such as continuous casting of blanks on a chilled wheel rim of the Properzi type, semicontinuous casting of sheets and billets, continuous casting between chilled cylinders of the Hazelett, Hunter or 3C type, or casting of items in a mold in sand in the so called "low pressure" system. In this last case the tube supplying the liquid metal to the mold is filled with grains of solid flux which are immobilized between two porous slabs of sintered flux, thus enabling perfectly sound articles to be obtained without any porosity.

In all cases application of the invention as just described substantially diminishes the content of inclusions and leads to a great reduction in the proportion of rejects in all the products obtained from metals and alloys thus treated.

We claim:

1. An apparatus for physico-chemical purification of a flow of liquid metal, comprising a detachable cartridge containing an upstream aperture through which the metal to be purified enters and a downstream aperture through which the purified metal is discharged, characterized in that the downstream aperture is closed by a porous slab obtained by sintering individual elements, at least the external part of which consists of an alkali or alkaline earth metal fluoride and a fluoride of a metal selected from the group consisting of magnesium, aluminum and manganese and that the cartridge is at least partially filled with grains of solid flux, at least the external part of which consists of at least one metallic halide.

2. The apparatus as claimed in claim 1 in which the flux grains form a layer within the cartridge in which the cartridge further includes a member extending downwardly into the layer for injecting gas or vapor into direct contact with the grains of solid flux.

3. The apparatus as claimed in claim 1, in which a porous block obtained by sintering individual elements also closes the upstream aperture, at least the external part of which consists of at least one metallic halide.

4. Apparatus as claimed in claim 3 in which the metallic halide has a melting point above 800° C.

5. The apparatus as claimed in claim 1, in which the cartridge has a plurality of layers of grains of flux.

6. The apparatus as claimed in claim 5, in which the various layers of grains of flux differ from one another in at least one physical and/or chemical property.

7. Apparatus as claimed in claim 6 in which the chemical composition of the flux grains in one layer differs from the chemical composition of the flux grains in another layer.

8. Apparatus as claimed in claim 6 in which the melting point of the flux grains in one layer differs from the melting point of the flux grains in another layer.

9. Apparatus as claimed in claim 6 in which the flux grains making up the layers differ in granulometry with grains increasing in dimension in the vertical direction.

10. The apparatus as claimed in claim 5, which includes porous blocks obtained by sintering individual elements separating the various layers of grains of flux at least the external part of which consist of at least one metallic halide.

11. The apparatus as claimed in claim 10, in which the metallic halides forming the grains of solid flux and the porous blocks are selected from simple or complexed fluorides and chlorides of a metal selected from the group consisting of sodium, lithium, potassium, calcium, barium, magnesium, aluminum and manganese.

12. Apparatus as claimed in claim 10 in which the metallic halide has a melting point above 800° C.

13. The apparatus as claimed in claim 1, which includes means for injecting gas or vapor into the grains in the form of a tube arranged substantially along the longitudinal axis of the cartridge.

14. The apparatus as claimed in claim 13, in which the tube is permeable to gases or vapors from inorganic or organic halides over at least part of the length which is in contact with the grains.

15. The apparatus as claimed in claim 1, which includes a ladle in which the detachable cartridge is arranged.

16. The apparatus as claimed in claim 15, in which the ladle is heat insulated.

17. The apparatus as claimed in claim 15, in which the ladle is fitted with heating means.

18. The apparatus as claimed in claim 15, which includes at least one internal partition which divides the ladle into at least two communicating compartments, the detachable cartridge being disposed in one of these compartments.

19. The apparatus as claimed in claim 15, which includes a means in the ladle for injecting a gas or a vapor into the area of the cartridge filled with the grains of the solid flux.

20. The apparatus as claimed in claim 15, which includes a cover fitted on the ladle.

21. Apparatus as claimed in claim 1 in which the metallic halide has a melting point above 800° C.

* * * * *